A. BURKE.
MIRROR FRAME.
APPLICATION FILED JAN. 23, 1917.
1,240,175. Patented Sept. 18, 1917.
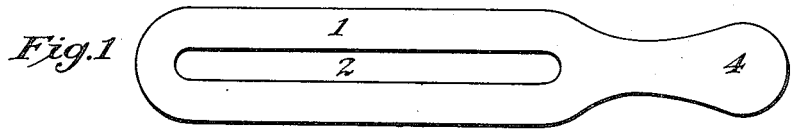
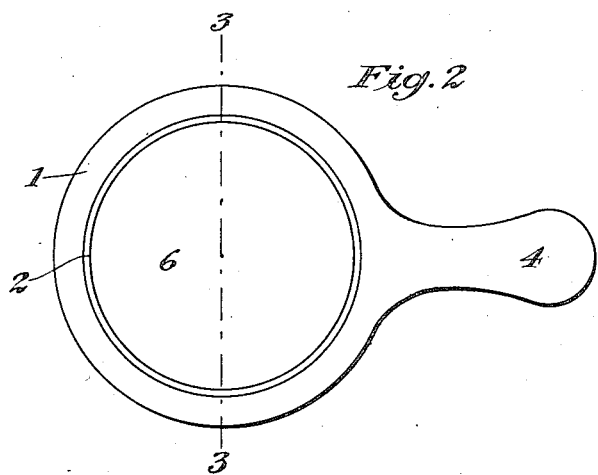
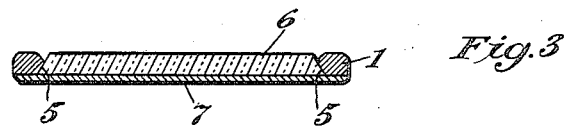
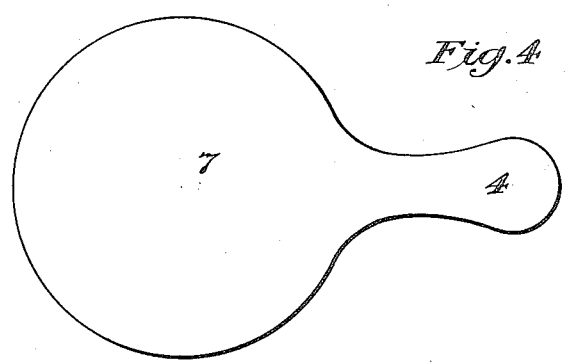
INVENTOR
Alfred Burke
BY
ATTORNEY

UNITED STATES PATENT OFFICE.

ALFRED BURKE, OF BROOKLYN, NEW YORK.

MIRROR-FRAME.

1,240,175.	Specification of Letters Patent.	Patented Sept. 18, 1917.

Application filed January 23, 1917. Serial No. 143,886.

*To all whom it may concern:*

Be it known that I, ALFRED BURKE, a citizen of the United States, residing at the borough of Brooklyn, in the city of New York, in the county of Kings and State of New York, have invented certain new and useful Improvements in Mirror-Frames, of which the following is a full, clear, and exact specification.

My invention relates particularly to an improvement in the manufacture of celluloid mirror frames or similar articles.

The object of this invention is to construct a frame consisting of a front and a back each made of a single piece of celluloid, the back being formed in the shape of the completed article and the front being formed by expanding a slitted strip to the required shape, and the two parts being cemented together.

According to my invention I am enabled to construct a frame with a minimum quantity of stock and to provide for easily inserting and securely holding the mirror in place therein.

In the accompanying drawings illustrating my invention, Figure 1 is a plan view of the front piece of the frame in its initial form, Fig. 2 is a plan view of the completed frame with the mirror inserted therein, Fig. 3 is a cross section on the line 3, 3 of Fig. 2, and Fig. 4 is a plan view of the back piece of the frame.

Similar numerals refer to similar parts throughout the several views.

In forming the frame, I take a piece of celluloid of the required thickness and cut or stamp therefrom a strip, substantially of the form shown in Fig. 1 of the drawings, to constitute the front section 1 of the frame. The strip has a long narrow slit or opening 2, preferably having rounded ends, formed therein, the stock surrounding the opening being of uniform width throughout and having an integral handle portion 4.

The lower, inner marginal portion of the strip is cut away, as seen in Fig. 3, to form an inclined edge 5 of approximately the same angularity as the bevel of the mirror 6 so that when the parts of the frame are cemented together the mirror will be securely held in place.

The strip is then heated and while the material is in softened condition the opening is spread to the configuration required for receiving the mirror.

The back piece 7 is cut or stamped from a thin sheet of celluloid directly in the shape in which it is required for the completed article. The back may be raised or embossed in any desired manner.

To complete the manufacture of the article, the mirror is inserted between the two parts of the frame and the latter are then cemented or otherwise joined together.

Because of the two-part construction of my improved frame, the mirror may be very easily inserted in place. My invention furthermore results in saving of stock in the manufacture of the frame as heretofore it has been necessary to initially cut in the frame an opening of sufficient diameter to receive the mirror thus requiring a sheet of considerable width.

Various modifications may be made in the construction of the frame hereinabove described without departing from the scope of the invention as defined in the claims.

What I claim as my invention and desire to secure Letters Patent for, is:

1. A method of manufacturing frames or similar articles which consists in forming a strip to constitute the front section, having an elongated opening and having the material surrounding the opening of substantially uniform width, from a sheet of celluloid; heating the strip to soften the material; shaping the opening to the required configuration for the completed article by spreading the material while it is in a softened condition; forming a back section in its completed shape from a sheet of celluloid; and uniting the two sections, substantially as described.

2. A method of manufacturing mirror frames which consists in forming a strip to constitute the front of the frame, having an elongated opening and having the material surrounding the opening of substantially uniform width, from a sheet of celluloid; heating the strip to soften the material; shaping the opening to the configuration required for receiving the mirror by spreading the material while it is in a softened condition; cutting away the lower, inner marginal edge of the opening; forming a back of required shape from a sheet of celluloid; inserting a mirror between the two parts of the frame; and joining said parts together, substantially as described.

ALFRED BURKE.